(12) United States Patent
Mazaki et al.

(10) Patent No.: US 12,479,317 B2
(45) Date of Patent: Nov. 25, 2025

(54) VEHICLE POWER SUPPLY SYSTEM (71) Applicant: DENSO CORPORATION, Kariya (JP)

(72) Inventors: Kouji Mazaki, Kariya (JP); Nobuhisa Yamaguchi, Kariya (JP); Mitsuru Shibanuma, Kariya (JP)

(73) Assignee: DENSO CORPORATION, Kariya (JP)

( * ) Notice: Subject to any disclaimer, the term of this patent is extended or adjusted under 35 U.S.C. 154(b) by 923 days.

(21) Appl. No.: 17/698,010

(22) Filed: Mar. 18, 2022

(65) Prior Publication Data
US 2022/0203848 A1    Jun. 30, 2022

Related U.S. Application Data

(63) Continuation of application No. PCT/JP2020/033375, filed on Sep. 3, 2020.

(30) Foreign Application Priority Data

Sep. 18, 2019  (JP) .................. 2019-169169

(51) Int. Cl.
*H02J 7/00* (2006.01)
*B60L 53/122* (2019.01)
(Continued)

(52) U.S. Cl.
CPC .......... *B60L 53/122* (2019.02); *H02J 50/005* (2020.01); *H02J 50/12* (2016.02); *H02J 50/40* (2016.02); *H02J 50/90* (2016.02)

(58) Field of Classification Search
CPC .......... B60L 53/00; B60L 53/10; B60L 53/11; B60L 53/12; B60L 53/122; B60L 53/126;
(Continued)

(56) References Cited

U.S. PATENT DOCUMENTS 5,573,090 A * 11/1996 Ross .................. B60L 5/005
                                                320/109
5,821,728 A * 10/1998 Schwind ............ H02J 50/40
                                                320/108
(Continued)

FOREIGN PATENT DOCUMENTS

JP    2014-082805 A       5/2014
JP    2015073380    *    4/2015
(Continued)

OTHER PUBLICATIONS

Nov. 2, 2020 International Search Report issued in International Patent Application No. PCT/JP2020/033375.

*Primary Examiner* — Alexis B Pacheco
(74) *Attorney, Agent, or Firm* — Oliff PLC (57) ABSTRACT

A vehicle power supply system is configured to supply power to a vehicle from a power supply apparatus laid on a power supply lane of a vehicle travel path, the power supply apparatus includes a plurality of power supply segments laid in a preset interval along the power supply lane, and a controller configured to control the plurality of power supply segments. The controller is configured to estimate timing of the vehicle reaching a next power supply segment that supplies power next after a present power supply segment that is supplying power, from at least a vehicle velocity derived from a change in position of the vehicle, and cause the next power supply segment to start power supply at the timing estimated.

5 Claims, 8 Drawing Sheets

(51) Int. Cl.
*H02J 7/14* (2006.01)
*H02J 50/00* (2016.01)
*H02J 50/12* (2016.01)
*H02J 50/40* (2016.01)
*H02J 50/90* (2016.01)

(58) Field of Classification Search
CPC .......... B60L 53/14; B06L 53/00; B06L 53/10; B06L 53/11; B06L 53/12; B06L 53/122; B06L 53/126; B06L 53/14
USPC .......................................................... 320/109
See application file for complete search history.

(56) References Cited

U.S. PATENT DOCUMENTS

| | | | | |
|---|---|---|---|---|
| 7,984,774 B2* | 7/2011 | Ippolito | ................. | B60M 7/003 |
| | | | | 320/109 |
| 8,469,122 B2* | 6/2013 | Perlman | ................. | B60L 53/124 |
| | | | | 342/372 |
| 8,493,024 B2* | 7/2013 | Kissel, Jr. | ................. | B60M 1/10 |
| | | | | 320/109 |
| 9,566,868 B2* | 2/2017 | Jammer | ................. | B60L 53/665 |
| 9,902,271 B2* | 2/2018 | Ichikawa | ................. | H02J 50/12 |
| 10,325,717 B2* | 6/2019 | Boys | ................. | B60L 5/005 |
| 10,343,535 B2* | 7/2019 | Cook | ................. | B60L 53/38 |
| 10,593,204 B2* | 3/2020 | Öhman | ................. | G08G 1/0133 |
| 10,897,156 B2* | 1/2021 | Bando | ................. | H02J 50/12 |
| 10,988,042 B1* | 4/2021 | Chase | ................. | B60L 53/305 |
| 2010/0225271 A1* | 9/2010 | Oyobe | ................. | B60L 50/61 |
| | | | | 320/108 |
| 2015/0094957 A1* | 4/2015 | Hyde | ................. | B60L 53/63 |
| | | | | 701/537 |
| 2015/0246614 A1* | 9/2015 | Dames | ................. | H05K 9/0075 |
| | | | | 191/10 |
| 2022/0149663 A1* | 5/2022 | Sumiya | ................. | H04B 5/79 |

FOREIGN PATENT DOCUMENTS

| | | | |
|---|---|---|---|
| JP | 2015073380 A | * | 4/2015 |
| JP | 2018-057073 A | | 4/2018 |
| WO | 2011/046405 A2 | | 4/2011 |

\* cited by examiner

VEHICLE POWER SUPPLY SYSTEM

CROSS-REFERENCE TO RELATED APPLICATION

The present application is a continuation application of International Application No. PCT/JP2020/033375, filed on Sep. 3, 2020, which claims priority to Japanese Patent Application No. 2019-169169, filed on Sep. 18, 2019. The contents of these applications are incorporated herein by reference in their entirety.

BACKGROUND

Technical Field

The present disclosure relates to a technique of supplying power to a vehicle capable of traveling by electric power.

Background Art

There is a technique of preventing a battery of a traveling vehicle from being insufficiently charged when the vehicle deviates from a power supply lane.

SUMMARY

In the present disclosure, provided is a vehicle power supply system as the following.

A power supply apparatus of the vehicle power supply system includes a plurality of power supply segments laid in a preset interval along a power supply lane, and a controller configured to control the plurality of power supply segments. The controller is configured to estimate a timing of a vehicle reaching a next power supply segment that supplies power next after a present power supply segment that is supplying power, from at least a vehicle velocity derived from a change in position of the vehicle, and cause the next power supply segment to start power supply at the timing estimated.

BRIEF DESCRIPTION OF THE DRAWINGS

The object described above and other objects, features, and advantages of the present disclosure are further clarified by the detail described below with reference to the drawings attached. The drawings include.

DETAILED DESCRIPTION OF THE PREFERRED EMBODIMENTS

In a technique disclosed in Japanese Patent Application Publication No. 2018-57073, an appropriate timing for starting to supply power to a vehicle from each of a plurality of power supply units laid along a travel path is changed in accordance with the acceleration and deceleration of the vehicle, but this change has not been sufficiently studied in conventional techniques.

According to one aspect of the present disclosure, there is provided a vehicle power supply system configured to supply power to a vehicle from a power supply apparatus laid on a power supply lane of a vehicle travel path. The power supply apparatus of this vehicle power supply system includes a plurality of power supply segments laid in a preset interval along the power supply lane, and a controller configured to control the plurality of power supply segments. The controller is configured to estimate a timing of the vehicle reaching a next power supply segment that supplies power next after a present power supply segment that is supplying power, from at least a vehicle velocity derived from a change in position of the vehicle, and cause the next power supply segment to start power supply at the timing estimated.

The vehicle power supply system according to this aspect is capable of starting to supply power to a vehicle from a power supply segment at an appropriate timing in accordance with the acceleration and deceleration of the vehicle.

A. First Embodiment

Figure 1:
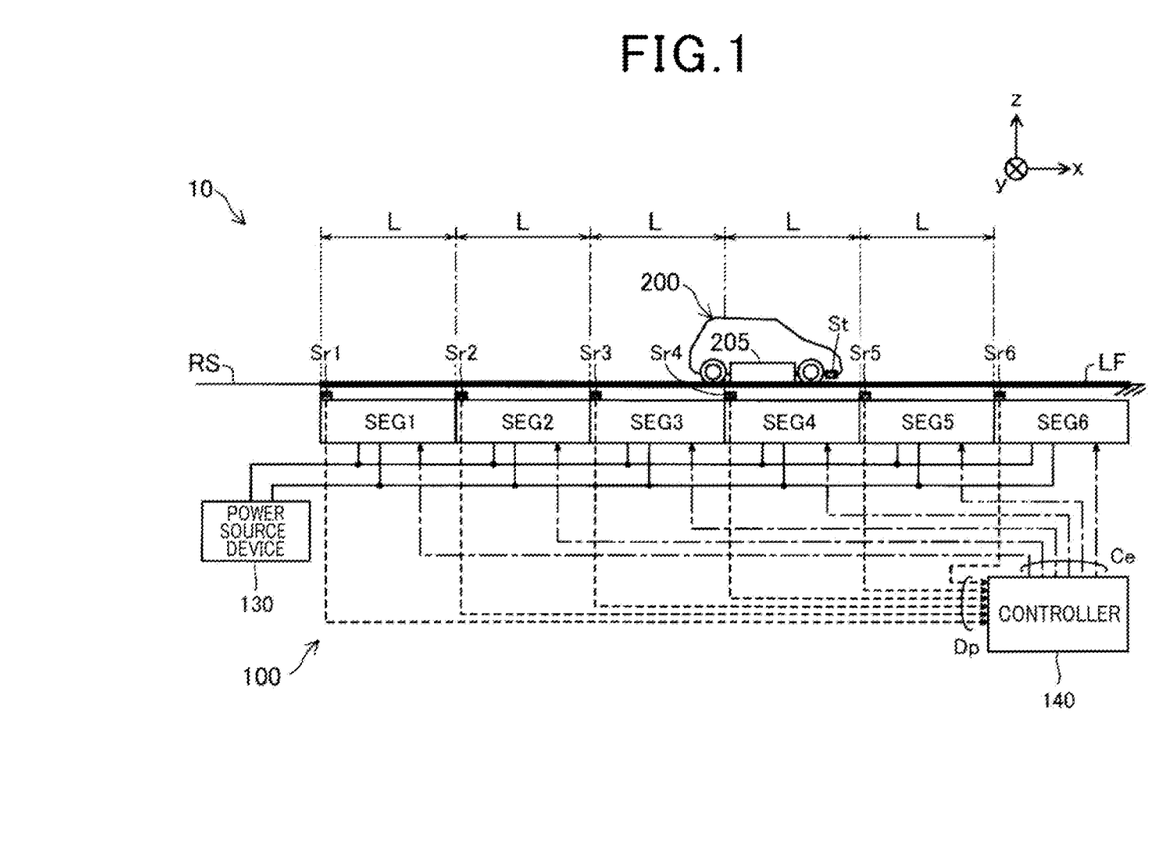
FIG. 1 is a diagram illustrating the overall configuration of a vehicle power supply system according to a first embodiment.

As illustrated in FIG. 1, a vehicle power supply system 10 is a power supply system capable of supplying power from a power supply apparatus 100 laid on a power supply lane LF along a vehicle travel path RS to a vehicle 200 passing the power supply lane LF, while a power transmitting section of the power supply apparatus 100 is in non-contact or contact with a power receiving section of the vehicle 200. The vehicle 200 is configured as, for example, an electric vehicle, a hybrid vehicle, or a fuel cell vehicle. In FIG. 1, an x direction represents a travel direction of the vehicle 200 along the vehicle travel path RS, a y direction represents a width direction of the vehicle travel path RS, and a z direction represents a vertical upper direction. The x, y, and z directions in the other diagrams shown later represent the same directions as in FIG. 1.

The vehicle 200 includes a power receiving device 205 having a power receiving section and a power receiving circuit (both not illustrated). The power receiving section is a circuit block that receives supply of electric power from a power supply segment SEG described later in a contact or non-contact manner, and the power receiving circuit is a circuit block that converts received electric power into electric power usable in the vehicle 200. The vehicle 200 includes, in addition, for example, a controller that controls the power receiving device 205, a battery that stores received electric power, a motor generator, and an inverter circuit that supplies electric power to the motor generator when the motor generator generates motive power, and supplies, when the motor generator generates electric power, the generated electric power to the battery, but these components are not illustrated.

The power supply apparatus 100 includes a plurality of power supply segments SEG, a power source device 130 that supplies direct-current electric power to the plurality of power supply segments SEG, and a controller 140 that controls the action of the plurality of power supply segments SEG.

Each of the power supply segments SEG includes a power transmitting circuit and a power transmitting section (both not illustrated). The power transmitting section is a circuit block that supplies electric power to the power receiving section included in the power receiving device 205 of the vehicle 200 in a contact or non-contact manner, and the power transmitting circuit is a circuit block that outputs, to the power transmitting section, electric power to be supplied. The power supply segments SEG are sequentially laid on the power supply lane LF in equal intervals with a laying interval L along the x direction.

FIG. 1 illustrates an example of six power supply segments SEG1 to SEG6, laid starting from a front side in the travel direction (x direction) of the power supply lane LF. The layout, however, is not limited to this example. The number of the power supply segments SEG laid on the power supply lane LF should be 3 or more, and is more preferably 4 or more. The front side in the travel direction (x direction) of the power supply lane LF is −x direction side and a rear side in the travel direction (x direction) of the power supply lane LF is +x direction side.

Each of the power supply segments includes a receiving sensor (in the present example, Sr1 to Sr6) laid at a front end thereof. That is, the receiving sensors Sr are sequentially laid in a laying interval L along the x direction. Meanwhile, the vehicle 200 includes a transmitter St mounted on a front-end bottom surface thereof so as to face the receiving sensor Sr. Each of the receiving sensors Sr receives an output signal of the transmitter St and can thereby sense the vehicle 200 having reached the position of a receiving sensor Sr that has received the output signal. A reception output Dp (in the present example, Dp1 to Dp6) from the receiving sensor Sr of each of the power supply segments SEG is input to the controller 140. This procedure enables the controller 140 to detect which receiving sensor Sr of the power supply segments SEG has received an output from the transmitter St, and thus to detect the position at which the vehicle 200 is on the power supply lane LF.

As the transmitter, a transmitting coil, an LD (laser diode), an LED (light-emitting diode), and the like can be used. As the receiving sensor, a receiving coil, a photodiode as a light-receiving element, and the like can be used in accordance with the type of the transmitter.

As described later, the controller 140 estimates timing of starting power supply by each of the power supply segments SEG based on the reception output Dp input from each of the receiving sensors Sr, and outputs a control signal Ce (in the present example, Ce1 to Ce6) for each of the power supply segments SEG to the power supply segment. This procedure allows the controller 140 to control the timing of starting power supply by each of the power supply segments SEG. The controller 140 is configured using, for example, a microcomputer. In each of the power supply segments SEG, the action of the power transmitting circuit is activated from the start of power supply instructed by the control signal Ce supplied from the controller 140 until a termination of the power supply is instructed, and electric power is thus output from the power transmitting circuit to the power transmitting section and supplied via the power transmitting section and the power receiving section to the power receiving device 205.

Figure 2:
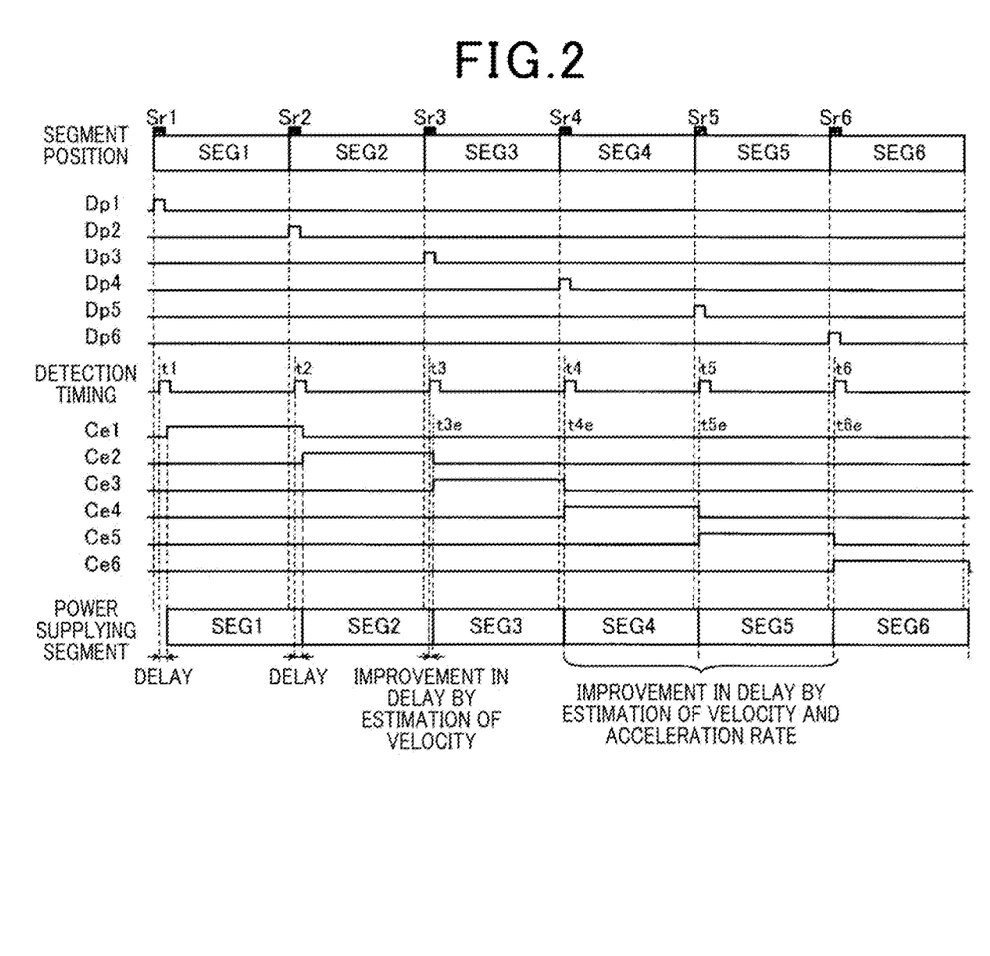
FIG. 2 is a time chart illustrating timing of starting power supply by each of power supply segments.

As illustrated in FIG. 2, when the vehicle 200 moves on the power supply lane LF (see FIG. 1), the receiving sensors Sr1 to Sr6 of the power supply segments SEG1 to SEG6 sequentially receive an output from the transmitter St of the vehicle 200 along with the movement of the vehicle 200 and output the reception outputs Dp1 to Dp6 to the controller 140. As illustrated in FIG. 2, the controller 140 detects, along with the reception outputs Dp1 to Dp6, timing representing the vehicle 200 having reached the front end of the power supply segments SEG1 to SEG6. FIG. 2 illustrates the detection timing of the power supply segments SEG1 to SEG 6 as time t1 to t6.

As described below, the controller 140 derives an average velocity and an acceleration rate of the vehicle 200 from the detection timing, and estimates the time of the vehicle 200 reaching the front end of a next power supply segment SEG, that is, the timing of starting power supply, with the derived average velocity and acceleration rate set to an initial velocity and an acceleration rate of linear motion with constant acceleration.

Figure 3:
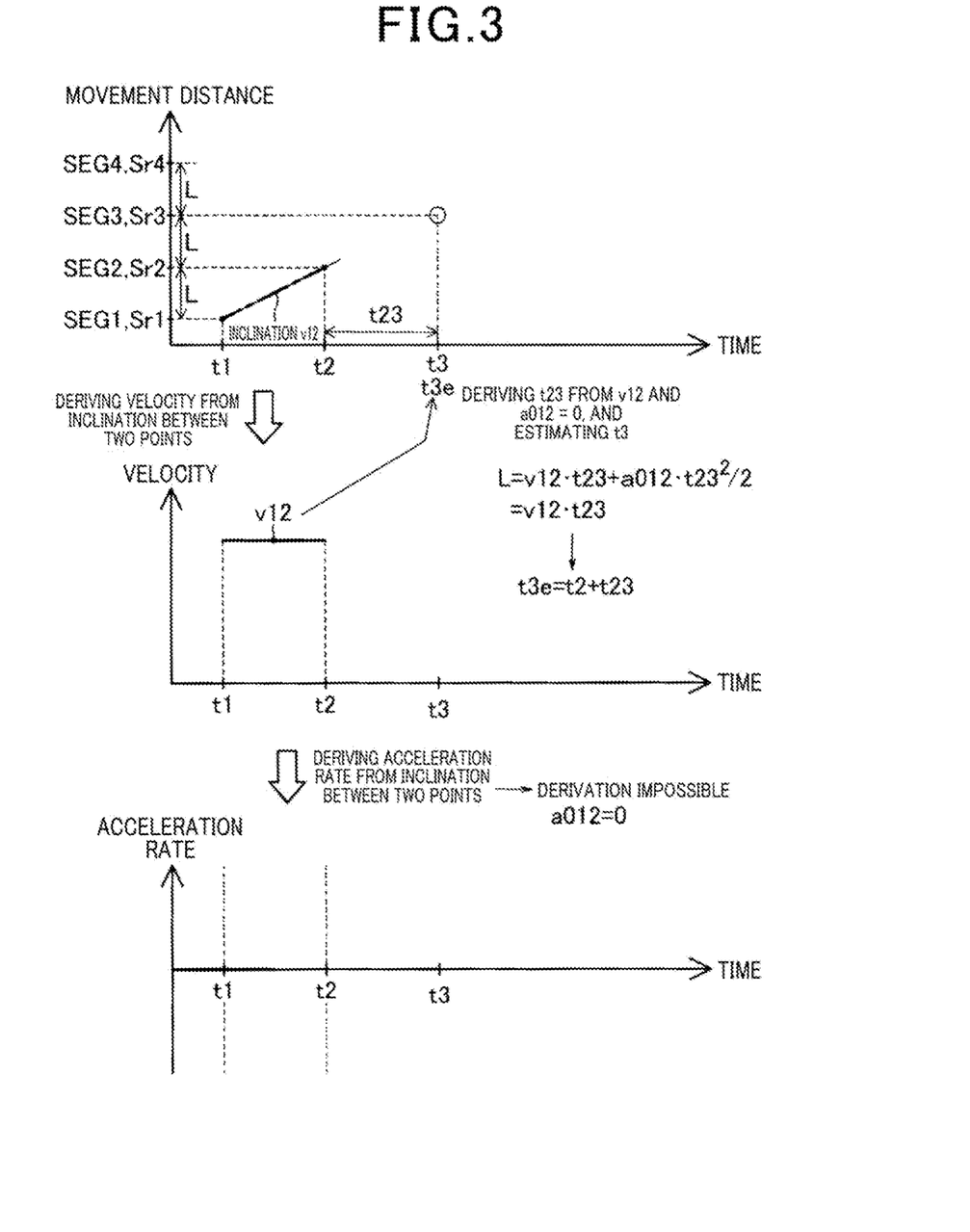
FIG. 3 is first diagrams illustrating estimation of timing of starting power supply.

The upper diagram of FIG. 3 illustrates a state in which the vehicle 200 is, through the detection by the first receiving sensor Sr1, detected to have passed the front end of the first power supply segment SEG1 at the time t1, and the vehicle 200 is, through the detection by the second receiving sensor Sr2, detected to have passed the front end of the second power supply segment SEG2 at the time t2. That is, the upper diagram of FIG. 3 illustrates a state in which the second power supply segment SEG2 is a present power supply segment that the vehicle 200 is passing and that is executing power supply, and the third power supply segment SEG3 is a next power supply segment.

The controller 140 cannot derive the average velocity and the acceleration rate when only detecting the time t1 as the detection timing of the first power supply segment SEG1, from the reception output Dp1 of the first receiving sensor Sr. Therefore, as illustrated in FIG. 2, with the time t1 set to the detection timing, the controller 140 makes the control signal Ce1 for the first power supply segment SEG1 active (H-level), and thus allows the first supply segment SEG1 to start power supply. Similarly, the controller 140 cannot derive the average velocity and the acceleration rate until it detects the time t2 as the detection timing of the second power supply segment SEG2, from the reception output Dp2 of the second receiving sensor Sr2. Therefore, as illustrated in FIG. 2, with the time t2 set to the detection timing, the controller 140 makes the control signal Ce1 for the first power supply segment SEG1 inactive (L-level), and thus allows the first power supply segment SEG1 to stop the power supply, whereas the controller 140 makes the control signal Ce2 for the second power supply segment SEG2 active, and thus allows the second power supply segment SEG2 to start power supply. As described above, in the first and second power supply segments SEG1, SEG2, the start and the stop of power supply are controlled with the time t1, t2 set to the detection timing, and therefore the timing of actually starting to supply power to the vehicle 200 is delayed, generating a waste time during which the power cannot be supplied.

Then, when the vehicle 200 is detected to have passed the front end of the second power supply segment SEG2 at the time t2 (see FIG. 2), the controller 140 obtains an inclination v12 of a movement distance L between the time t1 and the time t2 as illustrated in the upper diagram of FIG. 3, and thereby derives an average velocity v12 between the two points as illustrated in the middle diagram of FIG. 3. Further, the controller 140 derives, from the inclination of average velocity between two points, an acceleration rate a012 between the two points. As illustrated in the middle diagram of FIG. 3, however, only the average velocity v12 as one point is derived at the time t2, and therefore the acceleration rate a012 cannot be derived. The acceleration rate a012 in this case is defined as 0.

Here, as described below, the controller 140 estimates the time t3 (see the upper diagram of FIG. 3) that is the time of the vehicle 200 reaching the front end of a next power supply segment, i.e., the third power supply segment and that is the timing of starting power supply. That is, the motion of the vehicle 200 in a travel time t23 from the second power supply segment SEG2 to the third power supply segment SEG3 is regarded as linear motion with constant acceleration, and the derived average velocity v12 and acceleration rate a012 are estimated as an initial velocity and an acceleration rate of the linear motion with constant acceleration. In this case, the movement distance L of the vehicle 200 is represented by a following equation (1) according to the displacement equation of the linear motion with constant acceleration. Here, however, a012 equals 0, and therefore the motion of the vehicle 200 is regarded as linear motion with constant velocity and the movement distance L is represented by a following equation (2).

$$L = v12 \cdot t23 + a012 \cdot t23^2 / 2 \qquad (1)$$
$$= v12 \cdot t23 \qquad (2)$$

The controller 140 obtains the travel time t23 from the equation (2) and can thereby, as represented by a following equation (3), preliminarily derive the time t3 of the vehicle 200 reaching the front end of the third power supply segment SEG3 as estimated time t3e.

$$t3e = t2 + t23 \qquad (3)$$

This procedure enables the controller 140 to perform a control so as to allow the third power supply segment SEG3 to immediately start power supply by, as illustrated in FIG. 2, immediately making the control signal Ce2 for the second power supply segment SEG2 inactive and immediately making the control signal Ce3 for the third power supply segment SEG3 active at the estimated time t3e. This procedure enables an improvement in delay of the start timing of the third power supply segment as illustrated in FIG. 2. In this case, however, the time t3 is, as described above, estimated with the acceleration rate of the vehicle 200 defined as 0, and therefore the estimated time t3e does not reflect the acceleration and deceleration of the vehicle 200 but reflects the velocity of the vehicle 200. Accordingly, in comparison with when the time is estimated from the velocity and the acceleration rate of the vehicle, the estimated time t3e has a large error with respect to the time t3, but can improve the delay of the start timing in comparison with when the start of power supply is controlled with the actual detection timing used as a trigger, as in the first and second power supply segments SEG1, SEG2.

Figure 4:
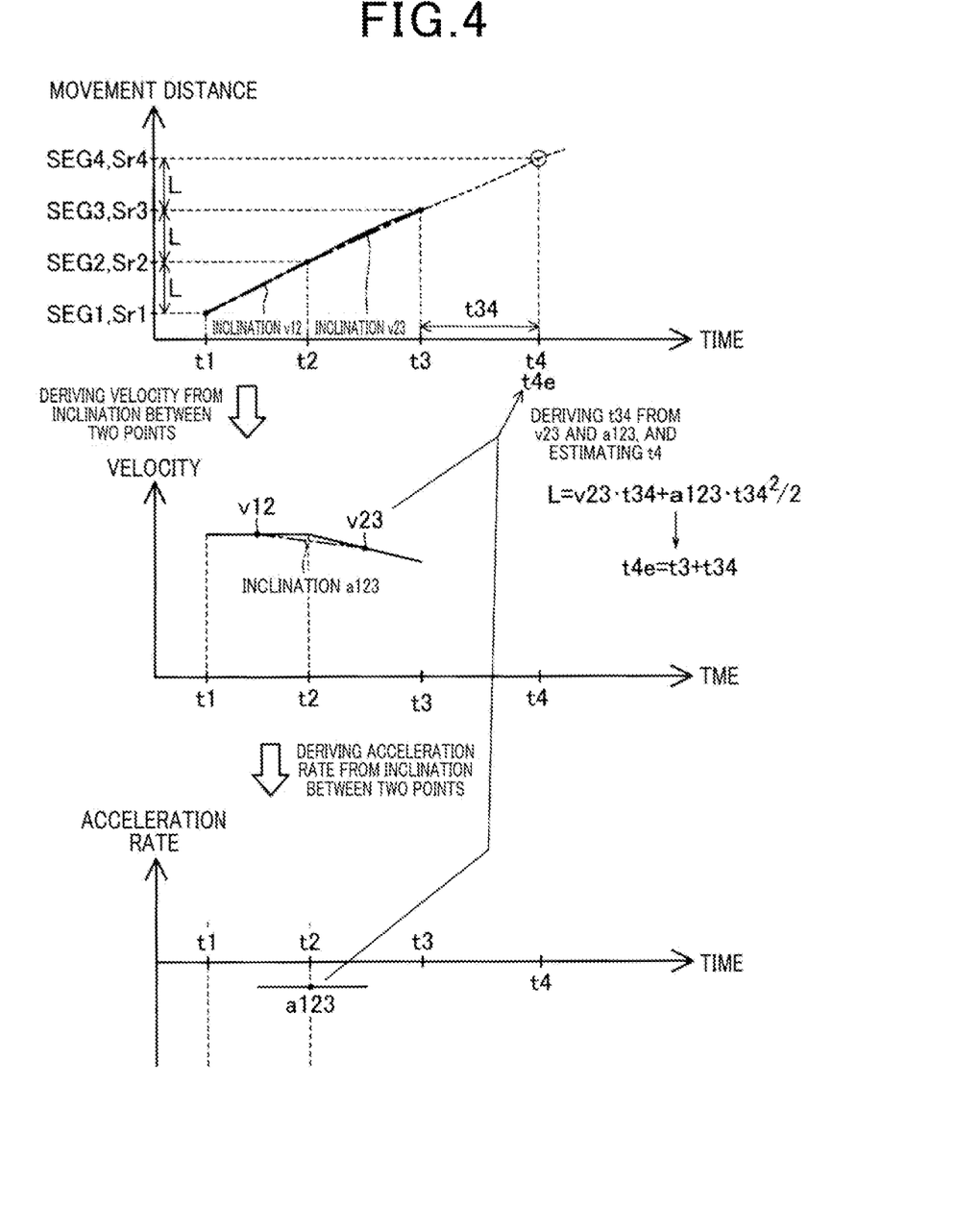
FIG. 4 is second diagrams illustrating the estimation of timing of starting power supply.

Next, the upper diagram of FIG. 4 following the upper diagram of FIG. 3 illustrates a state in which the vehicle 200 is, through the detection by the third receiving sensor Sr3, detected to have passed the front end of the third power supply segment SEG3 at the time t3. That is, the upper diagram of FIG. 4 illustrates a state in which the third power supply segment SEG3 is a present power supply segment that the vehicle 200 is passing, and the fourth power supply segment SEG4 is a next power supply segment.

When the vehicle 200 is detected to have passed the front end of the third power supply segment SEG3 at the time t3 (see FIG. 2), the controller 140 obtains an inclination v23 of a movement distance L between the time t2 and the time t3 as illustrated in the upper diagram of FIG. 4, and thereby derives an average velocity v23 between the two points as illustrated in the middle diagram of FIG. 4. Further, the controller 140 obtains an inclination a123 between two points, i.e., the first average velocity v12 and the second average velocity v23, and thereby derives an acceleration rate a123 between the two points as illustrated in the lower diagram of FIG. 4.

Here, as described below, the controller 140 estimates the time t4 (see the upper diagram of FIG. 4) that is the time of the vehicle 200 reaching the front end of a next power supply segment, i.e., the fourth power supply segment and that is the timing of starting power supply. That is, the motion of the vehicle 200 in a travel time t34 from the third power supply segment SEG3 to the fourth power supply segment SEG4 is regarded as linear motion with constant acceleration, and the derived average velocity v23 and acceleration rate a123 are estimated as an initial velocity and an acceleration rate of the linear motion with constant acceleration. In this case, the movement distance L of the vehicle 200 is represented by a following equation (4) according to the displacement equation of the linear motion with constant acceleration.

$$L = v23 \cdot t34 + a123 \cdot 34^2 / 2 \qquad (4)$$

The controller 140 obtains the travel time t34 from the equation (4) and can thereby, as represented by a following equation (5), preliminarily derive the time t4 of the vehicle 200 reaching the front end of the fourth power supply segment SEG4 as estimated time t4e.

$$t4e = t3 + t34 \qquad (5)$$

This procedure enables the controller 140 to perform control so as to allow the fourth power supply segment SEG4 to immediately start power supply by, as illustrated in FIG. 2, immediately making the control signal Ce3 for the third power supply segment SEG3 inactive and immediately making the control signal Ce4 for the fourth power supply segment SEG4 active at the estimated time t4e. Also in the fourth and following power supply segments SEG5, SEG6, the timing of starting power supply can be controlled by the same procedure as in the estimation of the timing of starting power supply by the fourth power supply segment SEG4. Accordingly, as illustrated in FIG. 2, the delay of the start timing of the fourth and following power supply segments can be improved further than the improvement in delay of the start timing of the third power supply segment.

As described above, the vehicle power supply system 10 estimates the time of the vehicle 200 reaching a next power supply segment SEG, that is, the timing of starting power supply, from the velocity, or the velocity and the acceleration rate of the vehicle 200, and can thereby control the start of power supply by the next power supply segment at appropriate timing. The vehicle power supply system 10 can prevent the generation of a waste time during which the power cannot be supplied due to the delayed timing of actually starting to supply power to the vehicle 200.

B. Second Embodiment

Figure 5:
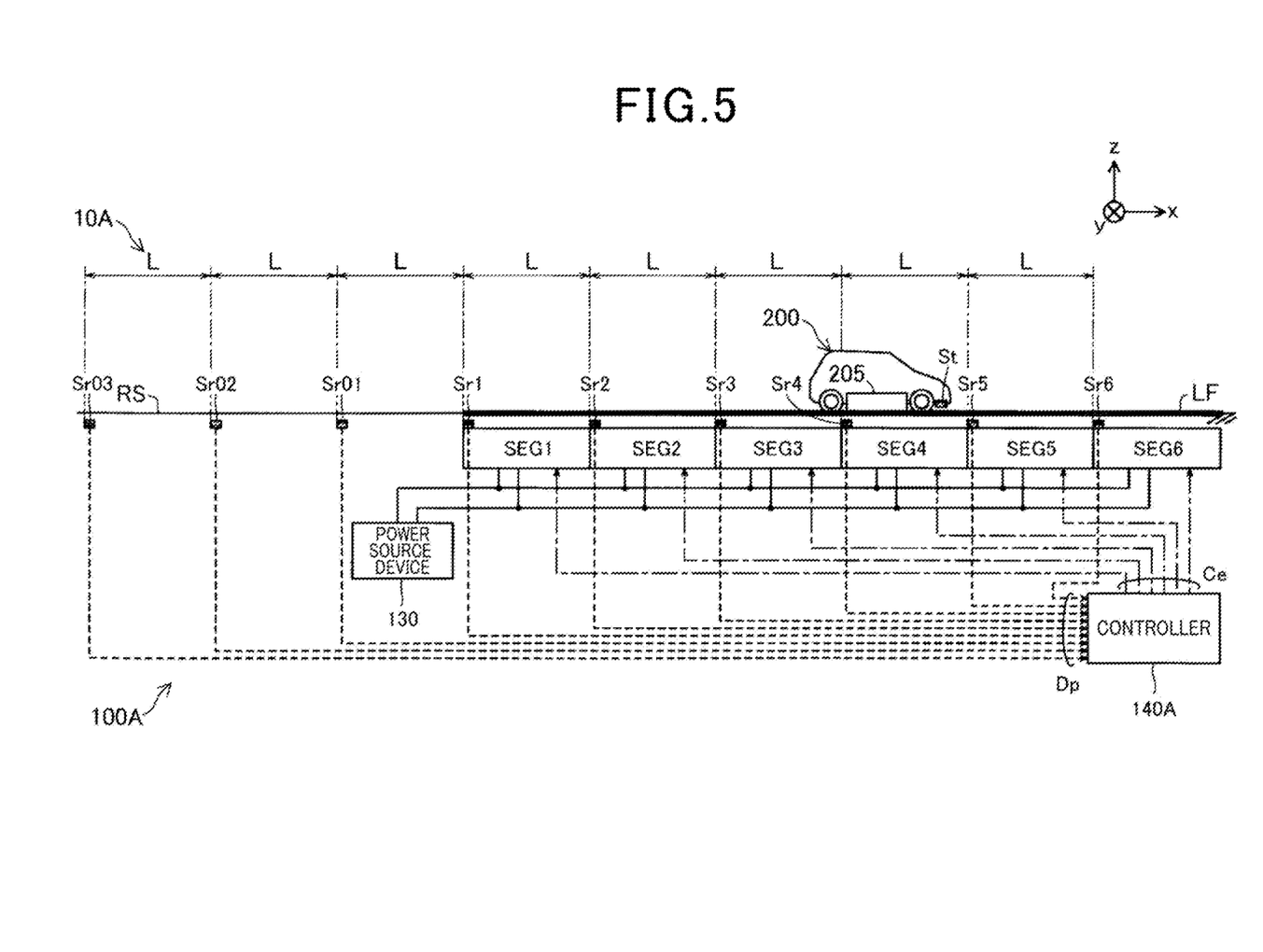
FIG. 5 is a diagram illustrating the overall configuration of a vehicle power supply system according to a second embodiment.

A power supply apparatus 100A of a vehicle power supply system 10A according to a second embodiment illustrated in FIG. 5 is different in that three receiving sensors Sr01 to Sr03 are laid in a laying interval L the same as the laying interval of six receiving sensors Sr1 to Sr6, on the front side of the power supply lane LF of the vehicle power supply system 10 (see FIG. 1) according to the first embodiment, and in including a controller 140A in place of the controller 140.

The control action of the controller 140A is the same as the control action of the controller 140 except for detecting the position of a vehicle 200 using not only reception outputs Dp1 to Dp6 from the receiving sensors Sr1 to Sr6 of power supply segments SEG1 to SEG6 but also reception outputs Dp01 to Dp03 from the receiving sensors Sr01 to Sr03.

Figure 6:
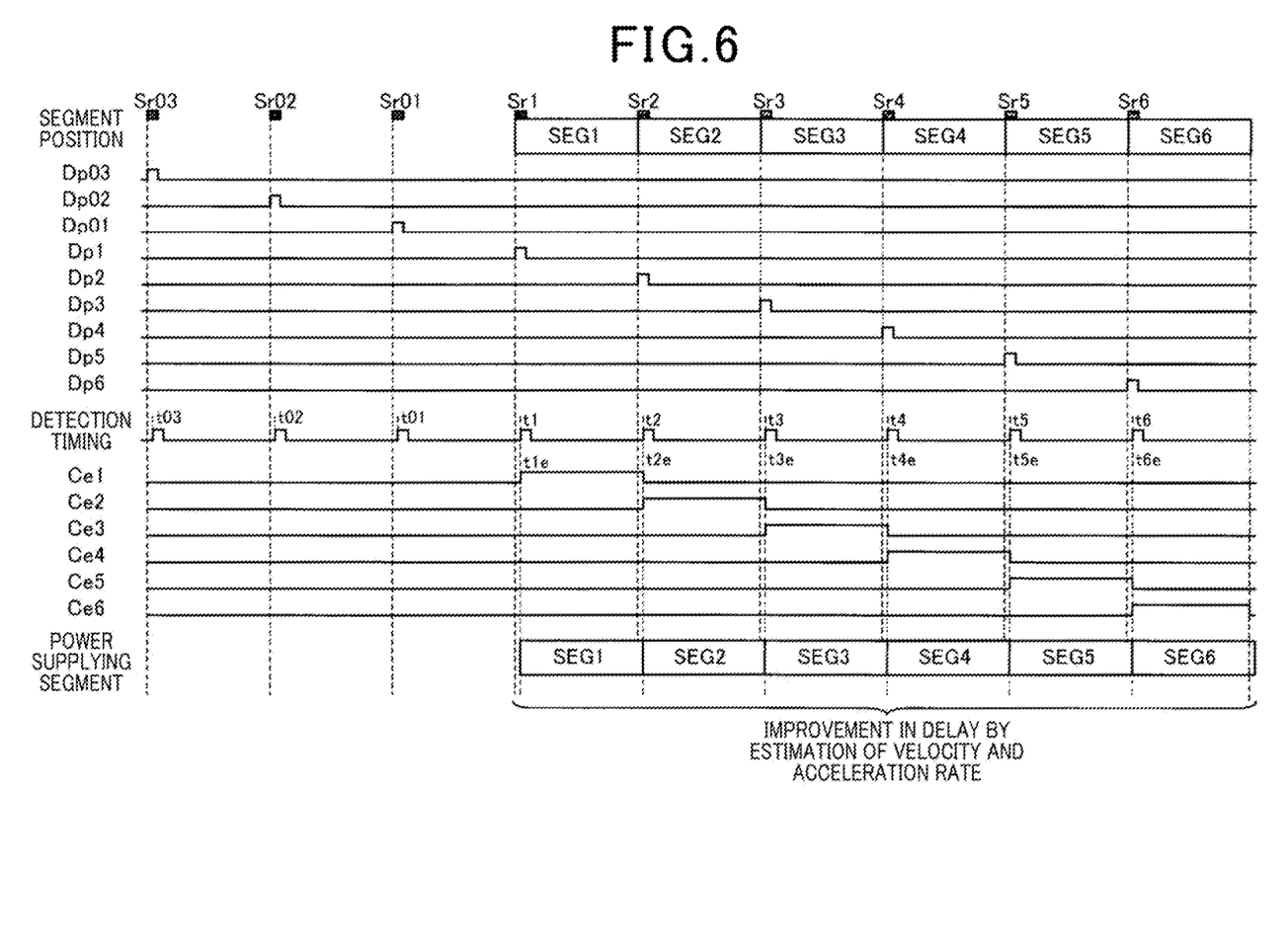
FIG. 6 is a time chart illustrating timing of starting power supply by each of power supply segments.

As illustrated in FIG. 6, the three receiving sensors Sr03 to Sr01 on the front side than the first power supply segment SEG1 also sequentially receive an output from a transmitter St (see FIG. 5) of the vehicle 200 along with the movement of the vehicle 200, and output the reception outputs Dp03 to Dp01 to the controller 140A similarly to the other receiving sensors Sr1 to Sr6 outputting the reception outputs Dp1 to Dp6. As illustrated in FIG. 6, the controller 140 detects the vehicle 200 having reached the front end of the dummy power supply segments along with the reception outputs Dp03 to Dp01. FIG. 6 illustrates the detection timing of the dummy power supply segments as time t03 to t01.

As illustrated in FIG. 6, the controller 140A detects the time t03 that is the detection timing of the receiving sensor Sr03, the time t02 that is the detection timing of the receiving sensor Sr02, and the time t01 that is the detection timing of the receiving sensor Sr01, the receiving sensor Sr01 being immediately before the first receiving sensor Sr1, the receiving sensor Sr02 being immediately before the receiving sensor Sr01, and the receiving sensor Sr03 being immediately before the receiving sensor Sr02. This procedure enables the controller 140A to derive an average velocity between the time t03 and the time t02 and an average velocity between the time t02 and the time t01, and to derive an acceleration rate from the derived average velocity at the two points. Then, the controller 140A sets the derived average velocity between the time t02 and the time t01 and acceleration rate to an initial velocity and an acceleration rate of linear motion with constant acceleration and can thereby estimate estimated time t1e for the time t1 of the vehicle 200 reaching the front end of the first power supply segment SEG1 (see FIG. 4).

This procedure enables the controller 140A to perform a control so as to allow the first power supply segment SEG1 to immediately start power supply by, as illustrated in FIG. 6, immediately making a control signal Ce1 for the first power supply segment SEG1 active at the estimated time t1e. Also in the second and following power supply segments SEG2 to SEG6, the timing of starting power supply can be controlled by the same procedure as in the estimation of the timing of starting power supply by the first power supply segment SEG1. Accordingly, as illustrated in FIG. 6, the delay of the start timing of all the power supply segments can be improved, and the delay can thus be more effectively improved than in the first embodiment.

C. Third Embodiment

Figure 7:
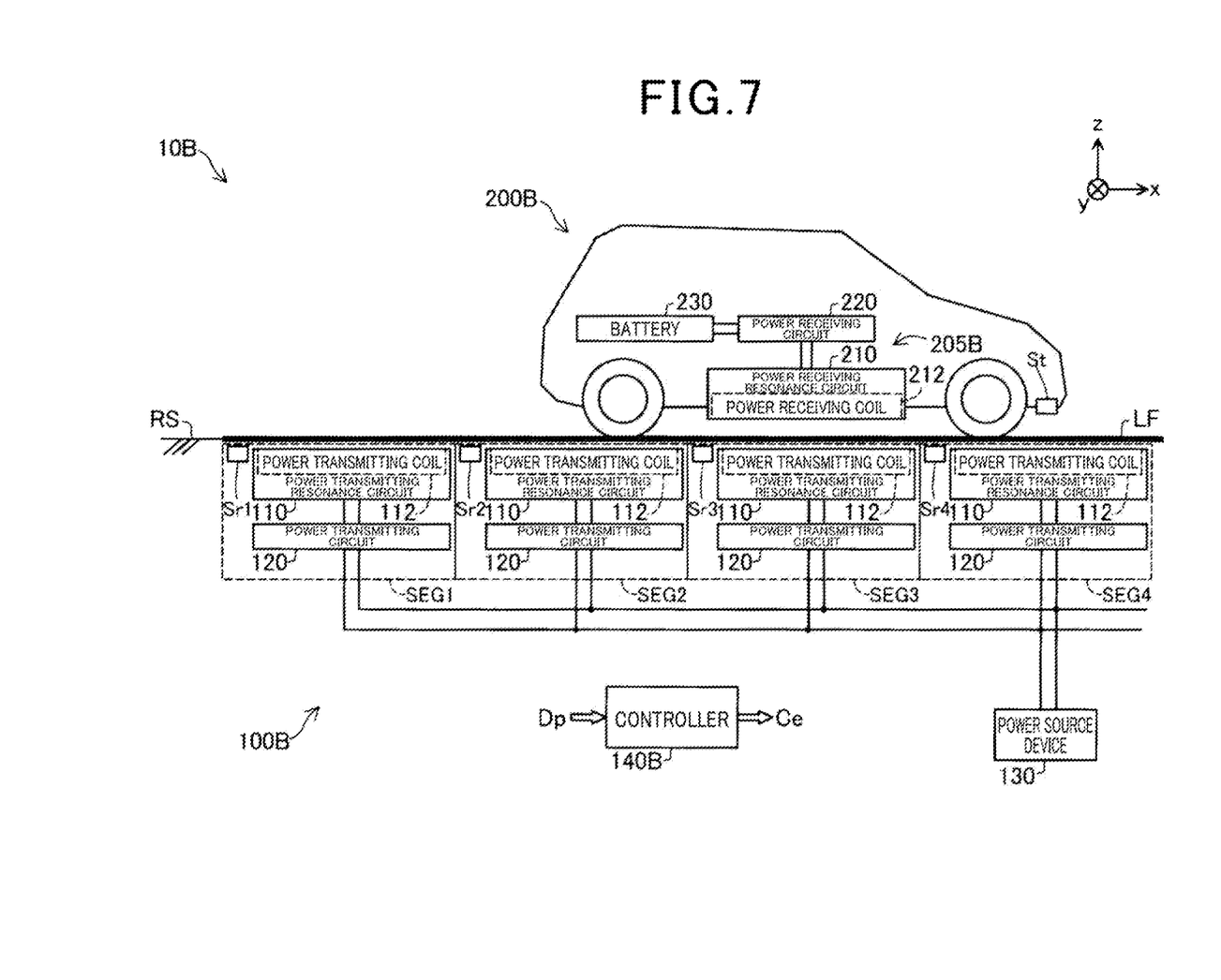
FIG. 7 is a diagram illustrating an application mode of the vehicle power supply system according to the first embodiment.

The vehicle power supply system 10 (see FIG. 1) according to the first embodiment is applicable as a non-contact power supply system 10B for vehicles illustrated in FIG. 7.

The non-contact power supply system 10B is a vehicle power supply system capable of supplying electric power from a power supply apparatus 100B laid on a power supply lane LF along a vehicle travel path RS to a vehicle 200B passing the power supply lane LF while a power transmitting section of the power supply apparatus 100B being in non-contact with a power receiving section of the vehicle 200B.

Similarly to the power supply apparatus 100, the power supply apparatus 100B includes a plurality of power supply segments SEG (in the example of the diagram, SEG1 to SEG4), a power source device 130 that supplies direct-current electric power to the plurality of power supply segments SEG, and a controller 140B that controls the action of the plurality of power supply segments SEG.

Each of the power supply segments SEG includes a power transmitting circuit 120, a power transmitting resonance circuit 110, and a receiving sensor Sr.

The power transmitting resonance circuit 110 includes a power transmitting coil 112 disposed on the power supply lane LF, and a resonance capacitor (not illustrated). The power transmitting coils 112 and the receiving sensors Sr of the power supply segments SEG are sequentially laid on the power supply lane LF in equal intervals along the x direction.

The power transmitting circuit 120 is a circuit that converts the direct-current electric power supplied from the power source device 130 into high-frequency alternating-current electric power and supplies the converted power to the power transmitting coil 112 that transmits power to the vehicle 200B. The power transmitting circuit 120 is configured as, for example, an inverter circuit, and is controlled between an active state (power supply) and an inactive state (non power supply) by a control signal Ce from the controller 140B. The power source device 130 is configured as, for example, an AC/DC converter circuit that outputs direct-current voltage obtained by rectifying alternating-current voltage of an external power source.

The vehicle 200B includes, as a power receiving device 205B, a power receiving resonance circuit 210 that is the power receiving section, a power receiving circuit 220, and a battery 230. The vehicle 200B also includes a transmitter St mounted on a front-end bottom surface thereof so as to face the receiving sensor Sr.

The power receiving resonance circuit 210 includes a power receiving coil 212 disposed on a central bottom in the front-back direction of the vehicle 200B, and a resonance capacitor (not illustrated), and is a device that obtains alternating-current electric power induced to the power receiving coil 212 by a magnetic field coupling phenomenon between the power receiving resonance circuit 210 and the power transmitting resonance circuit 110.

The power receiving circuit 220 is a circuit that converts the alternating-current electric power obtained by the power receiving resonance circuit 210 into direct-current electric power, and charges the battery 230 as a load. The electric power charged in the battery 230 is used to drive a motor (not illustrated) or the like.

The controller 140B is the same as the controller 140 of the vehicle power supply system 10 (see FIG. 1) according to the first embodiment, and estimates timing of starting power supply by each of the power supply segments SEG based on a reception output Dp input from the receiving sensor Sr of each of the power supply segments SEG, and outputs a control signal Ce for each of the power supply segments SEG to the power supply segment SEG. This procedure allows the controller 140B to control the timing of starting power supply by each of the power supply segments SEG.

The non-contact power supply system 10B for vehicles can also provide similar effects to the effects of the vehicle power supply system 10 according to the first embodiment.

Although not illustrated or described, the vehicle power supply system 10A (see FIG. 5) according to the second embodiment is, similarly to the non-contact power supply system 10B for vehicles (see FIG. 7), applicable as a non-contact power supply system for vehicles.

D. Fourth Embodiment

Figure 8:
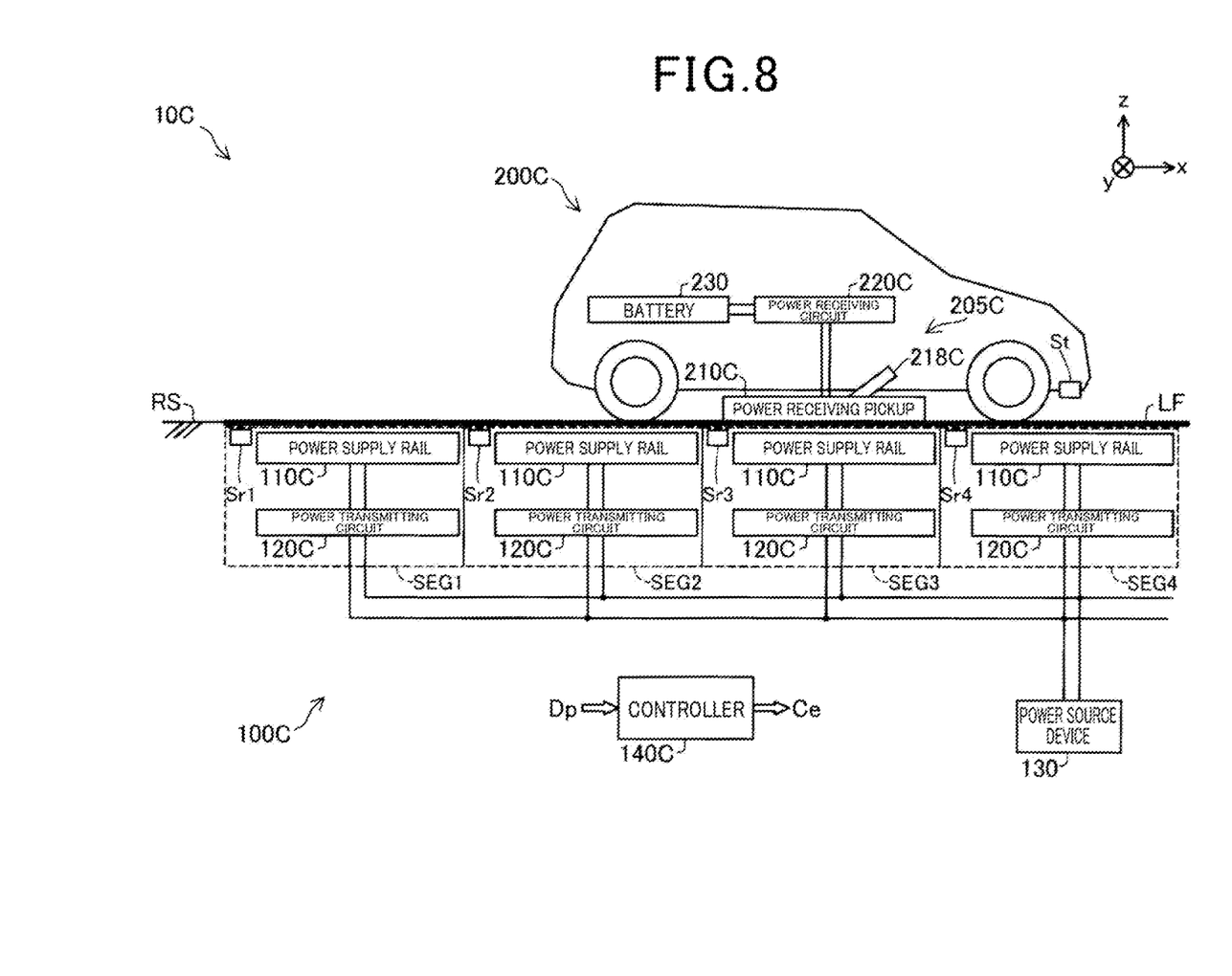
FIG. 8 is a diagram illustrating another application mode of the vehicle power supply system according to the first embodiment.

The vehicle power supply system 10 (see FIG. 1) according to the first embodiment is applicable as a contact power supply system 10C for vehicles illustrated in FIG. 8.

The contact power supply system 10C is a vehicle power supply system capable of supplying electric power from a power supply apparatus 100C laid on a power supply lane LF along a vehicle travel path RS to a vehicle 200C passing the power supply lane LF while a power transmitting section of the power supply apparatus 100C being in contact with a power receiving section of the vehicle 200C.

Similarly to the power supply apparatus 100, the power supply apparatus 100C includes a plurality of power supply segments SEG (in the example of the diagram, SEG1 to SEG4), a power source device 130 that supplies direct-current electric power to the plurality of power supply segments SEG, and a controller 140C that controls the action of the plurality of power supply segments SEG.

Each of the power supply segments SEG includes a power supply rail 110C, a power transmitting circuit 120C, and a receiving sensor Sr.

The power supply rail 110O is a pair of electrodes laid in parallel on the power supply lane LF. The power supply rails 110C and the receiving sensors Sr of the power supply segments SEG are sequentially laid on the power supply lane LF in equal intervals along the x direction.

The power transmitting circuit 120C is a circuit that supplies direct-current electric power supplied from the power source device 130 to the power supply rail 110C. The power transmitting circuit 120C is configured as, for example, a switch circuit.

The vehicle 200C includes, as a power receiving device 205C, a power receiving pickup 210C that is the power receiving section, a power receiving circuit 220C, and a battery 230. The vehicle 200C also includes a transmitter St mounted on a front-end bottom surface thereof so as to face the receiving sensor Sr.

The power receiving pickup 210C is supported by an arm 218C on a central bottom in the front-back direction of the vehicle 200C so as to be in contact with the power supply rail 110C, when receiving power supply from the power supply apparatus 100C. The power receiving pickup 210C includes a pair of electrodes provided so as to face the pair of electrodes of the power supply rail 110C, and is a device that obtains direct-current electric power from the power supply rail 110C by being in contact with the power supply rail 110C.

The power receiving circuit 220C is a circuit that charges the battery 230 with the direct-current electric power obtained by the power receiving pickup 210C. The electric power charged in the battery 230 is used to drive a motor (not illustrated) or the like.

The controller 140C is the same as the controller 140 of the vehicle power supply system 10 (see FIG. 1) according to the first embodiment, and estimates timing of starting power supply by each of the power supply segments SEG based on a reception output Dp input from the receiving sensor Sr of each of the power supply segments SEG, and outputs a control signal Ce for each of the power supply segments SEG to the corresponding one of the power supply segments SEG. This procedure allows the controller 140C to control the timing of starting power supply by each of the power supply segments SEG.

The contact power supply system 10C for vehicles can also provide similar effects to the effects of the vehicle power supply system 10 according to the first embodiment.

Although not illustrated or described, the vehicle power supply system 10A (see FIG. 5) according to the second embodiment is, similarly to the contact power supply system 10C for vehicles (see FIG. 8), applicable as a contact power supply system for vehicles.

E. Other Embodiments (1) In the embodiments, the vehicle power supply systems have been described that are configured to detect the vehicle reaching each of the power supply segments SEG by allowing the receiving sensors Sr laid on the power supply segments SEG to receive an output from the transmitter St mounted on the vehicle. The vehicle power supply system according to the present disclosure, however, is not limited to this configuration. For example, the vehicle can be configured not to include a transmitter mounted thereon. For example, as the receiving sensor, a sensor including a transmitter and a receiving sensor may be used, the sensor allowing the transmitter thereof to output a signal that is reflected on the vehicle, and the receiving sensor to receive the reflected signal so that the vehicle is sensed to have reached. Alternatively, as the receiving sensor, a camera may be used so that the vehicle is, from captured images, sensed to have reached.

Alternatively, a weight scale may be laid at the positions of the receiving sensors Sr so that the vehicle is, by the change in weight, sensed to have reached or passed.

(2) In the embodiments, the receiving sensors Sr1 to Sr6 of the power supply segments SEG1 to SEG6 laid on the power supply lane LF, and the receiving sensors Sr01 to Sr03 laid on the front side of the power supply lane LF are laid in equal intervals with the laying interval L preset. The receiving sensors Sr1 to Sr6 and Sr01 to Sr03, however, are not necessarily laid in equal intervals. The receiving sensors Sr1 to Sr6 of the power supply segments SEG1 to SEG6 on the power supply lane LF, and the receiving sensors Sr01 to Sr03 on the front side of the power supply lane LF are acceptable as long as they are laid in laying intervals that are preset and the information on the intervals is preliminarily saved in and known by the controller 140, 140A to 1400.

The control unit and the means thereof described in the present disclosure may be achieved by a dedicated computer provided by configuring a processor and a memory programmed so as to execute one or a plurality of functions embodied by a computer program. As an alternative, the control unit and the means thereof described in the present disclosure may be achieved by a dedicated computer provided by configuring a processor with one or more dedicated hardware logic circuits. As another alternative, the control unit and the means thereof described in the present disclosure may be achieved by one or more dedicated computers configured by combination of a processor and a memory programmed so as to execute one or a plurality of functions, with a processor configured with one or more hardware logic circuits. The computer program may be stored in a computer-readable non-transitory tangible recording medium, as an instruction to be executed by a computer.

The present disclosure is not limited to the embodiments, and can be achieved with various configurations, without departing from the spirit of the present disclosure. For example, the technical features in the embodiments that correspond to the technical features in the aspect described in Summary of the Invention can be replaced or combined with each other, as appropriate, to solve some or all the problems described above or accomplish some or all the effects described above. Alternatively, a technical feature not described as an essential feature in the present specification can be deleted as appropriate.

What is claimed is:

1. A vehicle power supply system configured to supply power to a vehicle from a power supply apparatus placed on a power supply lane of a vehicle travel path, the power supply apparatus comprising:
a plurality of power supply segments arranged in a preset interval along the power supply lane; and
a controller configured to control the plurality of power supply segments, and the controller being configured to:
derive a first average velocity, which is an average velocity of the vehicle from a first previous power supply segment immediately before a present power supply segment that is supplying power to the vehicle to the present power supply segment, using (i) a travel time of the vehicle from the first previous power supply segment to the present power supply segment and (ii) a distance from the first previous power supply segment to the present power supply segment;
estimate the first average velocity as an initial velocity of the vehicle traveling from the present power supply segment toward a next power supply segment that supplies power next after the present power supply segment;
derive a second average velocity, which is an average velocity of the vehicle from a second previous power supply segment immediately before the first previous power supply segment to the first previous power supply segment, using (i) a travel time of the vehicle from the second previous power supply segment to the first previous power supply segment and (ii) a distance from the second previous power supply segment to the first previous power supply segment;
estimate an acceleration rate, which is derived from a time taken for a change from the second average velocity to the first average velocity, as an acceleration rate of the vehicle traveling from the present power supply segment toward the next power supply segment;
estimate a timing of the vehicle reaching the next power supply segment, using (i) the estimated initial velocity of the vehicle, (ii) the estimated acceleration rate of the vehicle, and (iii) a distance from the present power supply segment to the next power supply segment; and
cause the next power supply segment to start power supply at the timing estimated.

2. A vehicle power supply system configured to supply power to a vehicle from a power supply apparatus placed on a power supply lane of a vehicle travel path, the power supply apparatus comprising:
a plurality of power supply segments that are arranged in a preset interval along the power supply lane and each include a receiving sensor configured to detect arrival of the vehicle; and
a controller configured to control the plurality of power supply segments, and the controller being configured to:
detect a position of the vehicle with respect to the plurality of power supply segments based on a detection result of each receiving sensor;
estimate a timing of starting power supply for each of the plurality of power supply segments using the detected position of the vehicle; and
control the timing of starting power supply for each of the plurality of power supply segments based on the estimated timings of starting power supply for the plurality of power supply segments.

3. The vehicle power supply system according to claim 2, wherein
the vehicle includes a transmitter, and
the receiving sensor of each of the plurality of power supply segments detects the arrival of the vehicle by receiving a signal transmitted from the transmitter.

4. The vehicle power supply system according to claim 2, wherein
the controller is configured to:
receive an output from each receiving sensor; and
detect the position of the vehicle using the output from each receiving sensor.

5. The vehicle power supply system according to claim 3, wherein
the controller is configured to:
receive an output from each receiving sensor; and
detect the position of the vehicle using the output from each receiving sensor.

* * * * *